(12) United States Patent
Sasaki et al.

(10) Patent No.: US 11,898,322 B2
(45) Date of Patent: Feb. 13, 2024

(54) WORKING MACHINE CONTROL DEVICE

(71) Applicant: KOBELCO CONSTRUCTION MACHINERY CO., LTD., Hiroshima (JP)

(72) Inventors: Hitoshi Sasaki, Hiroshima (JP); Seiji Saiki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 836 days.

(21) Appl. No.: 16/976,930

(22) PCT Filed: Jan. 24, 2019

(86) PCT No.: PCT/JP2019/002238
§ 371 (c)(1),
(2) Date: Aug. 31, 2020

(87) PCT Pub. No.: WO2019/187561
PCT Pub. Date: Oct. 3, 2019

(65) Prior Publication Data
US 2021/0010235 A1    Jan. 14, 2021

(30) Foreign Application Priority Data

Mar. 29, 2018    (JP) ................. 2018-064151

(51) Int. Cl.
*E02F 9/20* (2006.01)
*E02F 9/22* (2006.01)
*G06F 3/14* (2006.01)

(52) U.S. Cl.
CPC ............ *E02F 9/205* (2013.01); *E02F 9/2012* (2013.01); *E02F 9/2203* (2013.01); *E02F 9/2285* (2013.01); *G06F 3/1423* (2013.01)

(58) Field of Classification Search
CPC ....... E02F 9/205; E02F 9/2012; E02F 9/2203; E02F 9/2285; G06F 3/1423; G05D 2201/0202; G05D 1/0022
See application file for complete search history.

(56) References Cited

U.S. PATENT DOCUMENTS 6,435,289 B1    8/2002  Hori et al.
8,195,344 B2 *  6/2012  Song ................. E02F 9/2008
                                                             701/2

(Continued)

FOREIGN PATENT DOCUMENTS

CN    1940794 A    4/2007
JP    2-16220 A    1/1990

(Continued)

OTHER PUBLICATIONS

Chinese Office Action and Search Report dated Sep. 8, 2021 in Chinese Patent Application No. 201980014837.2 (with unedited computer generated English translation), 13 pages.

(Continued)

*Primary Examiner* — Nicholas Kiswanto
*Assistant Examiner* — Madison B Emmett
(74) *Attorney, Agent, or Firm* — Oblon, McClelland, Maier & Neustadt, L.L.P.

(57) ABSTRACT

A master-side device is provided outside a working machine and transmits, to a slave-side device, a command for controlling activation of an actuator. The master-side device is provided with a master-side lever and an operation pattern switching unit. The operation pattern switching unit switches a master-side operation pattern in which a first command according to an operation of the master-side lever is combined with a second command for an operation of a machine-side lever. The slave-side device transmits, to the (Continued)

master-side device, information of a machine-side operation pattern selected by an operation pattern switching valve.

9 Claims, 5 Drawing Sheets

(56) References Cited

U.S. PATENT DOCUMENTS

| | | | |
|---|---|---|---|
| 10,920,394 B2* | 2/2021 | Kobayashi | ............ E02F 9/2296 |
| 2003/0147727 A1 | 8/2003 | Fujishima et al. | |
| 2007/0073457 A1 | 3/2007 | Lee | |
| 2013/0000292 A1 | 1/2013 | Edler et al. | |
| 2016/0319514 A1* | 11/2016 | Dolan | ................... E02F 9/2066 |
| 2019/0249391 A1* | 8/2019 | Kikuchi | .................. E02F 3/845 |

FOREIGN PATENT DOCUMENTS

| | | | |
|---|---|---|---|
| JP | 7-207707 A | 8/1995 | |
| JP | 9-217383 A | 8/1997 | |
| JP | 2004-100282 A | 4/2004 | |
| JP | 2004-270363 A | 9/2004 | |
| JP | 2005-264613 A | 9/2005 | |
| JP | 2013-113311 A | 5/2013 | |
| JP | 2017-110419 A | 6/2017 | |

OTHER PUBLICATIONS

International Search Report dated Mar. 19, 2019 in PCT/JP2019/002238 filed Jan. 24, 2019, 2 pages.
Extended European Search Report dated Mar. 18, 2021 in European Patent Application No. 197766884, 8 pages.

* cited by examiner

WORKING MACHINE CONTROL DEVICE

TECHNICAL FIELD

The present invention relates to a working machine control device capable of remotely controlling a working machine.

BACKGROUND ART

Patent Literature 1 discloses a remote control type construction machine provided with an operation lever which operates activation of an actuator, an operation pattern switching valve which switches an operation pattern of the operation lever, detecting means which detects a switching position of the operation pattern switching valve, and an indicator which is provided at a position which can be visually checked from the outside of the construction machine and which displays the switching position detected by the detecting means. This enables an operator who conducts remote control to easily recognize a switching state of the operation pattern switching valve, thereby eliminating the risk of malfunction caused by the misunderstanding of the switching state.

However, it is a common practice that the operation pattern switching valve is mechanically fixed by a member which switches an operation pattern so as to prevent the operation pattern from being freely switched due to machine vibration or the like.

Therefore, for switching the operation pattern of the operation pattern switching valve, a person needs to access a site of a working machine to release the fixing, which costs labor and time. In a case, for example, of switching an operation pattern by a remote control device for a working machine, information of an operation pattern being currently selected by the operation pattern switching valve is required. However, for acquiring this information, a person needs to access a site of the working machine, which costs labor and time.

CITATION LIST

Patent Literature

Patent Literature 1: Japanese Unexamined Patent Publication No. H9-217383

SUMMARY OF INVENTION

An object of the present invention is to provide a working machine control device capable of easily switching an operation pattern without switching an operation pattern switching valve.

One aspect to the present invention is a working machine control device capable of remotely controlling a working machine provided with an actuator, a control valve which controls activation of the actuator, a machine-side operation unit which outputs a pilot pressure according to operation to the control valve, and an operation pattern switching valve which is provided in a pilot line between the machine-side operation unit and the control valve and switches a machine-side operation pattern as a combination of operation of the machine-side operation unit and activation of the actuator, the working machine control device including a slave-side device which is disposed in the working machine and controls activation of the actuator by controlling a pilot pressure of the pilot line; and a master-side device which is provided outside the working machine and is radio-communicable with the slave-side device, and transmits a command for controlling activation of the actuator to the slave-side device, in which the slave-side device transmits information of a machine-side operation pattern selected by the operation pattern switching valve to the master-side device, and the master-side device includes a master-side operation device which outputs a first command according to operation of an operator; an operation pattern switching unit which switches a master-side operation pattern as a combination of the first command and a second command to be transmitted to the slave-side device for operating the machine-side operation unit based on an instruction from an operator who refers to the information of the machine-side operation pattern, and converts the first command to the second command according to the switched master-side operation pattern; and a communication unit which transmits the second command converted by the operation pattern switching unit to the slave-side device.

DESCRIPTION OF EMBODIMENTS

First Embodiment

With reference to FIG. 1 to FIG. 4, description will be made of a working machine control device 40 and a working machine 1 for which the working machine control device 40 is used according to a first embodiment.

Figure 1:
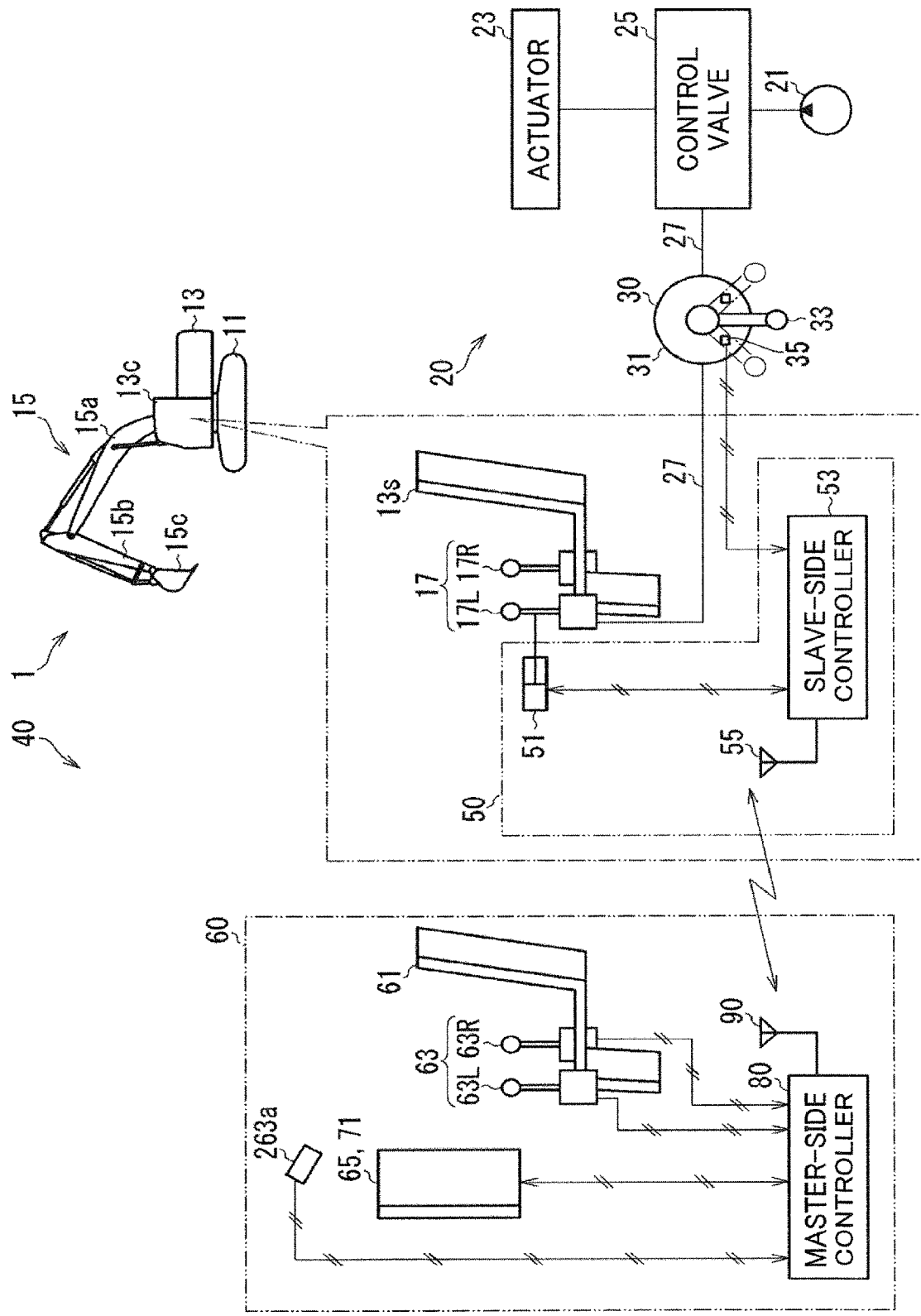
FIG. 1 is a block diagram showing a working machine control device according to a first embodiment.

The working machine 1 is, for example, a construction machine which conducts construction work, such as an excavator, a crane, and the like as shown in FIG. 1. The working machine 1 is provided with a lower travelling body 11, an upper slewing body 13, an attachment 15, a machine-side lever 17, and a hydraulic apparatus 20.

The lower travelling body 11 causes the working machine 1 to travel. The upper stewing body 13 is arranged above the lower travelling body 11 and is turnable relative to the lower travelling body 11. The upper slewing body 13 is provided with a driver's room 13c. A driver's room inside seat 13s is provided inside the driver's room 13e.

The attachment 15 is a device attached to the upper slewing body 13 to conduct work. The attachment 15 is provided with, for example, a boom 15a, an arm 15b, and a bucket 15c. The boom 15a is attached to the upper slewing body 13 so as to be rotatable (to go up and down). The arm 15b is rotatably attached to the boom 15a. The bucket 15c is rotatably attached to the arm 15b.

The machine-side lever 17 (one example of a machine-side operation device) is an operation lever for operating the working machine 1. Since the working machine 1 is remotely controlled, the machine-side lever 17 need not be operated by an operator. The machine-side lever 17 is a lever for operating an actuator 23 to be described later. The machine-side lever 17 is a lever for operating the attachment 15. The machine-side lever 17 is also a lever for turning (right turn, left turn) the upper slewing body 13 relative to the lower travelling body 11. The machine-side lever 17 is arranged in the driver's room 13c. The machine-side lever 17 is provided on a right side and a left side of the driver's room inside seat 13s. The machine-side lever 17 on the right side is assumed to be a machine-side lever 17R and the machine-side lever 17 on the left side is assumed to be a machine-side lever 17L.

Figure 3:
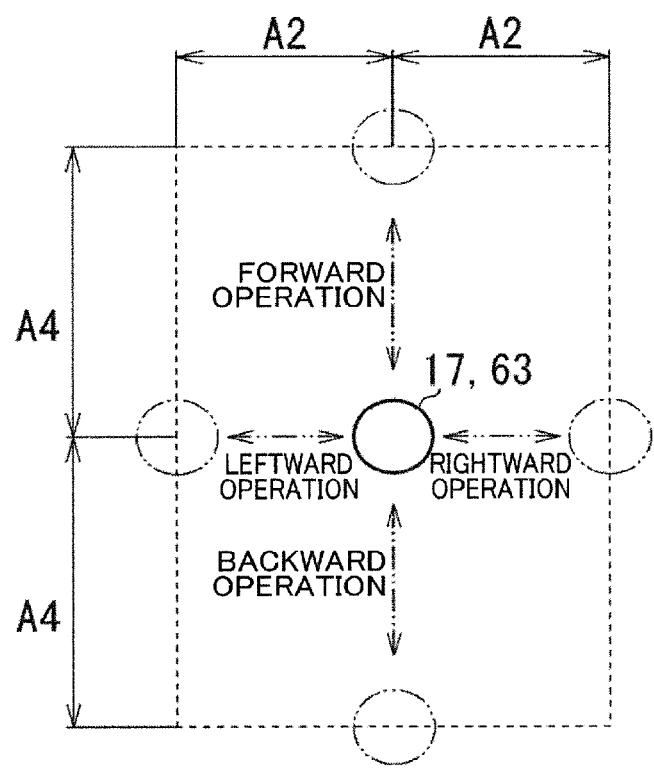
FIG. 3 is a diagram showing amounts of strokes of a machine-side lever and a master-side lever shown in FIG. 1.

Parameters related to the machine-side lever 17 include an operation direction, an amount of operation, and an amount of stroke. Operations of the machine-side lever 17 are forward operation of leaning forward, backward operation of leaning backward, leftward operation of leaning leftward, and rightward operation of leaning rightward as shown in FIG. 3. The above-described forward, backward, leftward, and rightward directions represent the forward, backward, leftward, and rightward directions seen from an operator sitting on the driver's room inside seat 13s. "An amount of operation" of the machine-side lever 17 represents an amount of operation from a neutral position of the machine-side lever 17, which is, for example, an angle or a distance from the neutral position of the machine-side lever 17. "An amount of stroke" of the machine-side lever 17 represents an amount of operation from the neutral position of the machine-side lever 17 up to a maximum amount of operation that the machine-side lever 17 can assume. For example, an amount of stroke (e.g., A4) in the forward operation is equal to an amount of stroke (e.g., A4) in the backward operation as shown in FIG. 3. For example, an amount of stroke (e.g., A2) in the leftward operation is equal to an amount of stroke (e.g., A2) in the rightward operation. For example, the amount of stroke (A4) in each of the forward operation and backward operation is larger than the amount of stroke (A2) in each of the leftward operation and rightward operation. The amount of stroke (A2) in each of the forward operation and backward operation may be smaller than or the same as the amount of stroke (A2) in each of the leftward operation and rightward operation.

Figure 4:
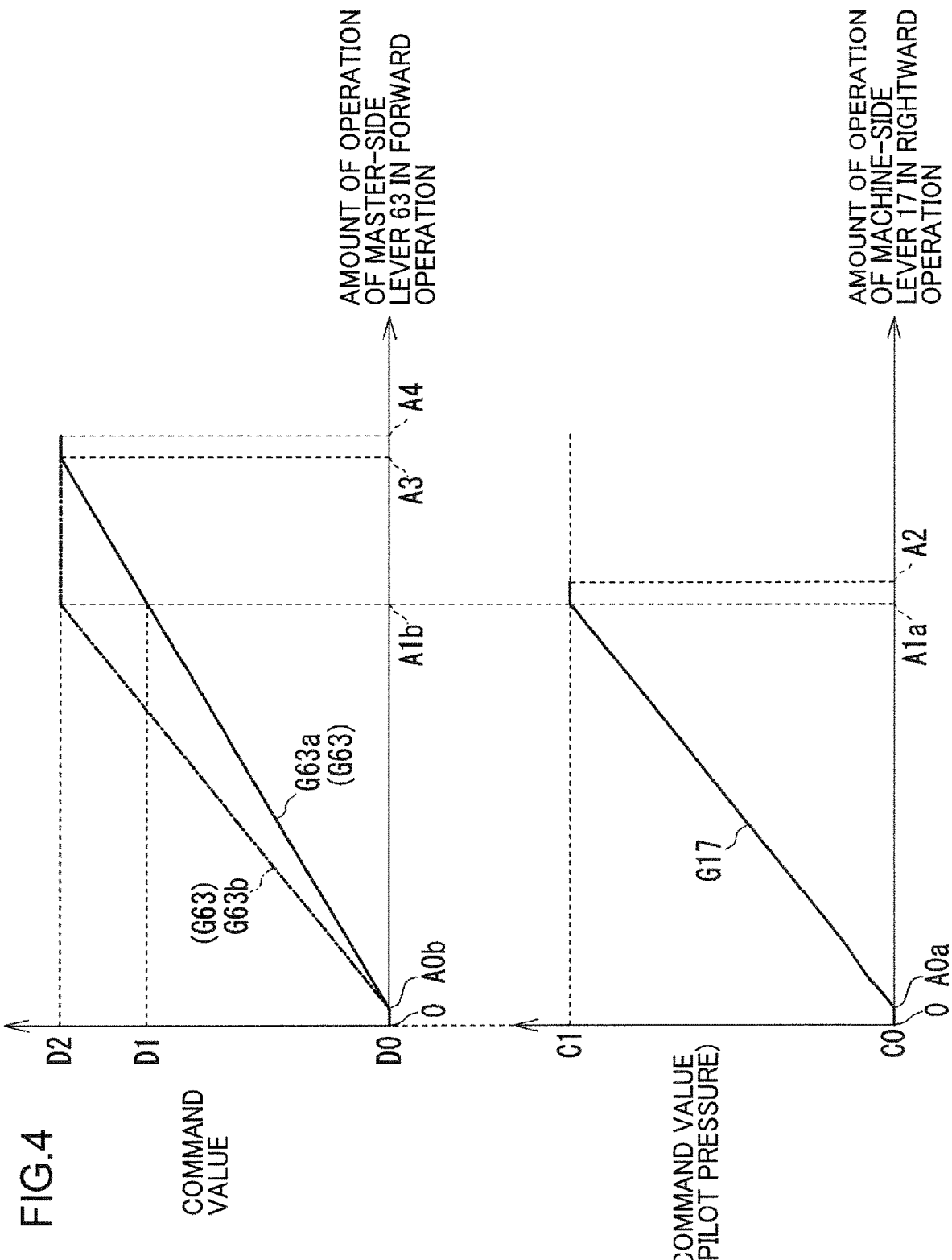
FIG. 4 is a graph showing a relationship between an amount of operation and a command value of each of the machine-side lever and the master-side lever shown in FIG. 1.

The machine-side lever 17 outputs a pilot pressure (a hydraulic pressure, a command value) according to an operation direction and an amount of operation to a control valve 25 via a pilot line 27 shown in FIG. 1. As shown in FIG. 4, the larger an amount of operation becomes, the larger a command value outputs the machine-side lever 17. A "command value" is a value not less than 0% and not more than 100% in a case, for example, where a minimum command value C0 is 0% and a maximum command value C1 is 100%. This is also the case with a command value of a master-side lever 63.

A relationship between an amount of operation of the machine-side lever 17 and a command value of the machine-side lever 17 is assumed to be a machine-side operation characteristic G17. "Operation characteristic" represents a relationship between an amount of operation and a command value. A specific example of the machine-side operation characteristic G17 is as follows. The lower part of FIG. 4 illustrates a graph showing the machine-side operation characteristic G17, in which the vertical axis shows a command value indicative of a pilot pressure and the horizontal axis shows an amount of operation of the machine-side lever 17. In a section in which the amount of operation of the machine-side lever 17 is from 0 to an amount of play A0a that is slightly larger than 0, the command value is constant to be the minimum command value C0. In a section in which the amount of operation of the machine-side lever 17 is from the amount of play A0a to a command-value-maximum amount of operation A1a that is slightly smaller than a maximum amount of operation A2, the larger the amount of operation becomes, the larger becomes the command value, i.e., for example, the command value is proportional to the amount of operation. In a section in which the amount of operation of the machine-side lever 17 is from the command-value-maximum amount of operation A1a to the maximum amount of operation A2, the command value is constant to the the maximum command value C1.

The hydraulic apparatus 20 activates the working machine 1 shown in FIG. 1 by hydraulic pressure. The hydraulic apparatus 20 is provided with a pump 21, the actuator 23, the control valve 25, the pilot line 27, and an operation pattern switching valve 30. The pump 21 is a hydraulic pump which discharges an activation oil.

The actuator 23 activates the working machine 1. The actuator 23 is a hydraulic actuator to be driven by supply of an activation oil. The actuator 23 is composed of a plurality of actuators provided. Examples of the actuator 23 include a boom cylinder which causes the boom 15a to rotate (go up and down) relative to the upper slewing body 13, an arm cylinder which causes the arm 15b to rotate relative to the boom 15a, and a bucket cylinder which causes the bucket 15c to rotate relative to the arm 15b. The examples of the actuator 23 also include a turning motor which causes the upper stewing body 13 to turn relative to the lower travelling body 11.

The control valve 25 controls activation of the actuator 23. The control valve 25 controls a direction and a flow rate of an activation oil to be supplied from the pump 21 to the actuator 23. The control valve 25 is provided with a plurality of valves. Specifically, the control valve 25 is provided with a valve for the boom cylinder, a valve for the arm cylinder, a valve for the bucket cylinder, and a valve for the turning motor. The control valve 25 is controlled according to a pilot pressure input to the control valve 25.

The pilot line 27 is provided between the machine-side lever 17 and the control valve 25. The pilot line 27 is connected to the machine-side lever 17 and the control valve 25. The pilot line 27 transmits the pilot pressure output by the machine-side lever 17 to the control valve 25. The pilot line 27 is composed of a plurality of pilot lines provided. Specifically, the pilot line 27 includes eight types of the pilot lines 27, pilot lines for raising the boom 15a, for lowering the boom 15a, for bending the arm 15b, for stretching the arm 15b, for scooping with the bucket 15c, for releasing the bucket 15c, for turning right the upper slewing body 13, and for turning left the upper slewing body 13.

The operation pattern switching valve 30, which is called also a multi-control valve, is a valve capable of switching a machine-side operation pattern. The operation pattern is composed of a machine-side operation pattern and a master-side operation pattern to be described later. The machine-side operation pattern is a combination of operation of the machine-side lever 17 and activation of the actuator 23. Specifically, the machine-side operation pattern is a pattern of combination of a total of eight operation directions including operations of the machine-side lever 17R in four directions and operations of the machine-side lever 17L in four directions, and eight kinds of activation of the actuator 23. The eight kinds of activation of the actuator 23 are specifically for raising the boom 15a, for lowering the boom 15a, for bending the arm 15b, for stretching the arm 15b, for scooping with the bucket 15c, for releasing the bucket 15c, for turning right the upper slewing body 13, and for turning left the upper slewing body 13.

The operation pattern switching valve 30 is provided in the pilot line 27. The operation pattern switching valve 30 is provided with, for example, a main body unit 31, a switching lever 33, and a machine-side operation pattern detection unit 35. When the switching lever 33 rotates relative to the main body unit 31, a valve provided in the main body unit 31 is switched. Then, oil passages of the plurality of pilot lines 27 are switched. As a result, the machine-side operation pattern is switched. The switching lever 33 is fixed to the main body unit 31 by fixing means such as a bolt. This arrangement intends to prevent the switching lever 33 from being freely switched due to vibration or the like. By contrast, when the switching lever 33 is intentionally switched, work of attaching or detaching the fixing means is generated to cost labor.

The machine-side operation pattern detection unit 35 detects which machine-side operation pattern being selected by the operation pattern switching valve 30. The machine-side operation pattern detection unit 35 is, for example, a limit switch or the like. The machine-side operation pattern detection unit 35, for example, detects a position of the switching lever 33 relative to the main body unit 31.

The working machine control device 40 is a device which remotely controls the working machine 1 from the outside of the working machine 1. The working machine control device 40 is provided with a slave-side device 50 and a master-side device 60.

The slave-side device 50 is disposed in the working machine 1. The slave-side device 50 controls activation of the actuator 23 by controlling a pilot pressure of the pilot line 27. The slave-side device 50 controls activation of the actuator 23 by, for example, controlling the machine-side lever 17. The slave-side device 50 is provided with a lever operation device 51, a slave-side controller 53, and a slave-side antenna 55.

The lever operation device 51 operates the machine-side lever 17 by moving the machine-side lever 17. The lever operation device 51 operates the machine-side lever 17R and the machine-side lever 17L in each of the forward, backward, leftward, and rightward directions. The lever operation device 51 is attached to the machine-side lever 17. The lever operation device 51 is, for example, a cylinder, a motor, or the like.

The slave-side controller 53 conducts signal (information) input/output, computation, storage of information, and the like. The slave-side controller 53 is configured to be radio-communicable with the master-side device 60 by using the slave-side antenna 55. The slave-side device 50 can control activation of the actuator 23 by controlling a pilot pressure of the pilot line 27 without moving the machine-side lever 17 by using the lever operation device 51. In this case, the slave-side controller 53 can control the pilot pressure of the pilot line 27, for example, by controlling a valve provided in the pilot line 27 according to a second command and a command value transmitted from the master-side device 60.

The master-side device 60 is a device provided outside the working machine 1 for remotely controlling the working machine 1. The master-side device 60 is provided with a master-side seat 61, the master-side lever 63, a display unit 65 (one example of each of a first display unit and a second display unit), and an operation unit 71. The master-side device 60 is further provided with a master-side controller 80 and a master-side antenna 90 (one example of a communication unit). The master-side seat 61 is a seat on which an operator who conducts remote control of the working machine 1 sits.

The master-side lever 63 (one example of a master-side operation device) is an operation lever for remotely controlling the working machine 1. The master-side lever 63 is a lever for operating the actuator 23 similarly to the machine-side lever 17. The master-side lever 63 is substantially the same lever as the machine-side lever 17. The master-side lever 63 is provided on a right side and a left side of the master-side seat 61. The master-side lever 63 on the right side is denoted as a master-side lever 63R and the master-side lever 63 on the left side is denoted as a master-side lever 63L.

Parameters related to the master-side lever 63 include an operation direction, an amount of operation, and an amount of stroke similarly to the machine-side lever 17. Operation directions of the master-side lever 63 include forward operation of leaning forward, backward operation of leaning backward, leftward operation of leaning leftward, and rightward operation of leaning rightward as shown in FIG. 3. The above-described forward, backward, leftward, and rightward directions represent the forward, backward, leftward, and rightward directions seen from an operator sitting on the master-side seat 61.

For example, an amount of stroke of the master-side lever 63 is the same as an amount of stroke of the machine-side lever 17 as shown in FIG. 3. In more detail, an amount of stroke (A4) in each of the forward operation and the backward operation of the master-side lever 63 is the same as the amount of stroke (A4) in each of the forward operation and the backward operation of the machine-side lever 17. An amount of stroke (A2) in each of the leftward operation and the rightward operation of the master-side lever 63 is the same as the amount of stroke (A2) in each of the leftward operation and the rightward operation of the machine-side lever 17. The amount of stroke of the master-side lever 63 and the amount of stroke of the machine-side lever 17 may be different in all the directions or in a part of the operation directions.

The master-side lever 63 outputs a first command indicative of classification information and an operation direction of the master-side lever 63 and an amount of operation to the master-side controller 80. The classification information of the master-side lever 63 is information indicating whether the operated master-side lever 63 is the master-side lever 63L or the master-side lever 63R. The master-side lever 63 increases an amount of operation to be output as an inclination angle of the lever is increased substantially in the same manner as the machine-side lever 17.

The upper part of FIG. 4 illustrates a graph showing a master-side operation characteristic G63, which shows a relationship between an amount of operation of the master-side lever 63 and a command value to be transmitted to the slave-side device 50 shown in FIG. 1. The vertical axis shows a command value and the horizontal axis shows an amount of operation of the master-side lever 63. Examples of the master-side operation characteristic G63 shown in FIG. 4 include a first master-side operation characteristic G63a which is used in a case of non-execution of operation characteristic identical control to be described later and a second master-side operation characteristic G63b which is used in a case of execution of the operation characteristic identical control to be described later.

A specific example of the first master-side operation characteristic G63a is as follows. In a section in which the amount of operation of the master-side lever 63 is from 0 to an amount of play A0b that is slightly larger than 0, the command value is constant to be a minimum command value D0. In a section in which the amount of operation of the master-side lever 63 is from the amount of play A0b to a command-value-maximum amount of operation A3 that is slightly smaller than a maximum amount of operation A4, the larger the amount of operation becomes, the larger becomes the command value, i.e., for example, the command value is proportional to the amount of operation. In a section in which the amount of operation of the master-side lever 63 is from the command-value-maximum amount of operation A3 to the maximum amount of operation A4, the command value is constant to be a maximum command value D2.

In a case of non-execution of the operation characteristic identical control, the amount of operation of the master-side lever 63 is converted to a command value by an operation characteristic setting unit 87 according to the first master-side operation characteristic G63a. On the other hand, in a case of execution of the operation characteristic identical control, the amount of operation of the master-side lever 63 is converted to a command value by the operation characteristic setting unit 87 according to the second master-side operation characteristic G63b.

Reference will be returned to FIG. 1. The display unit 65 displays information. As shown in FIG. 1, the display unit 65 is arranged in front of the master-side seat 61 so as to be opposed to the master-side seat 61. Contents displayed on the display unit 65 include, for example, video captured by a camera not shown and provided in the upper slewing body 13 and video captured by a camera provided in the driver's room 13c. Display contents of the display unit 65 other than these videos will be described later.

The operation unit 71 is a device which accepts operation such as selection etc. from an operator. The operation unit 71 may be configured with the display unit 65, for example. The operation unit 71 may be configured with a switch and a button displayed on the display unit 65 and a touch sensor provided on the display unit 65, for example. The operation unit 71 may be configured with a touch panel or the like provided separately from the display unit 65, or with a physical switch, a physical button or the like provided separately from the display unit 65. The operation unit 71 is a device for an operator to select the master-side operation pattern to he described later and is one example of an operation pattern operating unit. The operation unit 71 is a device for an operator to select setting of the master-side operation characteristic G63 shown in the upper part of FIG. 4 and is one example of the operation characteristic setting unit 87. The operation unit 71 is also a device for an operator to select whether to conduct the operation characteristic identical control to be described later or not and is one example of an acquisition unit. The operation unit 71 may be also a device for an operator to arbitrarily set the master-side operation characteristic G63 shown in the upper part of FIG. 4, and may be one example of an operation characteristic arbitrary operating unit in this case. The operation pattern operating unit, the operation characteristic setting unit, and the operation characteristic arbitrary operating unit may be implemented by the common operation unit 71 or may not.

Figure 2:
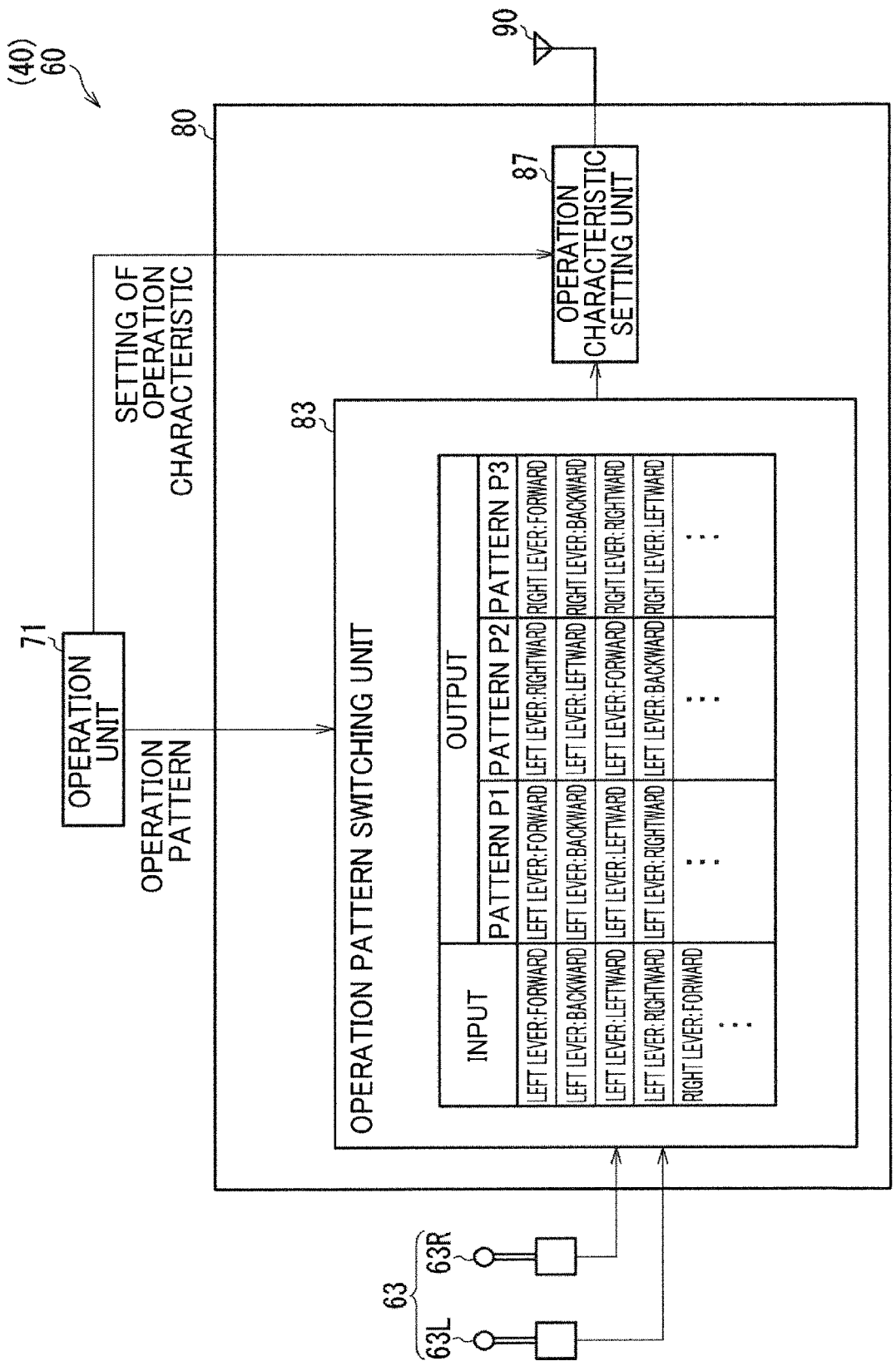
FIG. 2 is a block diagram showing a master-side controller shown in FIG. 1.

The master-side controller 80 conducts signal (information) input/output, computation, storage of information, and the like. The master-side controller 80 is connected to the components (the master-side lever 63, the display unit 65, etc.) of the master-side device 60. The master-side controller 80 is configured to be radio-communicable with the slave-side device 50 by using the master-side antenna 90. The master-side controller 80 converts the first command output from the master-side lever 63 to the second command to be described later and converts an amount of operation output from the master-side lever 63 to a command value to transmit the conversion results to the slave-side device 50. As shown in FIG. 2, the master-side controller 80 is provided with an operation pattern switching unit 83 and the operation characteristic setting unit 87.

The operation pattern switching unit 83 switches a master-side operation pattern. The master-side operation pattern is a combination of the first command output from the master-side lever 63 and the second command transmitted to the slave-side device 50 for operating the machine-side lever 17. The operation pattern switching unit 83 converts the first command to the second command according to a switched master-side operation pattern and outputs the converted second command in combination with an amount of operation output from the master-side lever 63 to the operation characteristic setting unit 87. The second command includes identification information of the machine-side lever 17 and an operation direction.

The operation pattern switching unit 83 is provided with, for example, a memory not shown which stores one or a plurality of master-side operation patterns in advance. Although the number of master-side operation patterns stored by the operation pattern switching unit 83 is three (patterns P1, P2, and P3) in the example shown in FIG. 2, the number may be two or less, or four or more. In the present embodiment, the operation pattern switching unit 83 determines, as a target master-side operation pattern to be switched, one master-side operation pattern selected by an operator using the operation unit 71 from among the plurality of master-side operation patterns stored in advance in the memory. This is one example only, and the operation pattern switching unit 83 may determine, as a target master-side operation pattern to be switched, an arbitrary master-side operation pattern manually set by an operator using the operation unit 71 and stored in the memory. The operation characteristic setting unit 87 sets the second master-side operation characteristic G63b (see FIG. 4) according to a master-side operation pattern switched by the operation pattern switching unit 83. In this case, the operation characteristic setting unit 87 need only set the second master-side operation characteristic G63b by conducting the operation characteristic identical control to be described later. When conducting the operation characteristic identical control, the operation characteristic setting unit 87 need only determine a command value corresponding to an amount of operation of the master-side lever 63 according to the second master-side operation characteristic G63b and transmit the determined command value together with the second command to the slave-side device 50 via the master-side antenna 90. On the other hand, in a case of non-execution of the operation characteristic identical control, the operation characteristic setting unit 87 need only determine a command value corresponding to an amount of operation of the master-side lever 63 according to the first master-side operation characteristic G63a and transmit the determined command value together with the second command to the slave-side device 50 via the master-side antenna 90.

(Machine-Side Operation Pattern Information)

The slave-side device 50 shown in FIG. 1 acquires machine-side operation pattern information. The machine-side operation pattern information is information of a machine-side operation pattern selected by the operation pattern switching valve 30. The machine-side operation pattern information may be automatically detected or manually input. For example, the machine-side operation pattern information may be automatically detected by the machine-side operation pattern detection unit 35. For example, an operator near the working machine 1 or the like may watch a position of the switching lever 33 of the operation pattern switching valve 30 and input the machine-side operation pattern information to the slave-side device 50. For example, an operator may operate the machine-side lever 17 or the master-side lever 63 to check how the actuator 23 is activated, and then input the machine-side operation pattern information to the slave-side device 50.

The slave-side device 50 transmits the acquired machine-side operation pattern information to the master-side device 60 via the slave-side antenna 55. The master-side controller 80 causes the display unit 65 to display the received machine-side operation pattern information. Specifically, the display unit 65 displays the machine-side operation pattern information selected by the operation pattern switching valve 30. The machine-side operation pattern information is information indicative of a correspondence between each operation direction of the forward, backward, leftward, and rightward directions of the machine-side levers 17L and 17R and activation of the actuator 23 corresponding to each operation direction, for example, right turn for the rightward operation of the machine-side lever 17L and left turn for the leftward operation of the machine-side lever 17L.

Since the machine-side operation pattern information is displayed on the display unit 65, an operator who remotely controls the working machine 1 can grasp a current machine-side operation pattern. Accordingly, the operator can grasp, for example, whether switching of a master-side operation pattern is necessary or not. The operator can further refer to the machine-side operation pattern information to input an instruction for determining a switching target master-side operation pattern from among master-side operation patterns determined in advance.

(Stroke Amount Information)

The slave-side device 50 acquires stroke amount information. The stroke amount information is information about an amount of stroke of the machine-side lever 17. The stroke amount information may be automatically detected or manually input. The stroke amount information may be acquired by, for example, detecting, by a sensor provided in the lever operation device 51, an amount of stroke when the lever operation device 51 moves the machine-side lever 17.

For example, when the slave-side device 50 is mounted on the working machine 1, calibration of the working machine control device 40 is conducted. The slave-side device 50 may acquire stroke amount information acquired at this time of calibration. The slave-side device 50 may acquire the stroke amount information by, for example, inputting known stroke amount information of the machine-side lever 17. For example, an operator need only operate the machine-side lever 17 to check an amount of stroke and input the amount of stroke to the slave-side device 50.

The slave-side device 50 transmits the acquired stroke amount information to the master-side device 60 by radio communication. The master-side controller 80 causes the display unit 65 to display the received stroke amount information. Specifically, the display unit 65 displays an amount of stroke of each of the machine-side lever 17R and the machine-side lever 17L in each operation direction. Since the stroke amount information is displayed on the display unit 65, an operator can grasp an amount of stroke of the machine-side lever 17. Accordingly, the operator can grasp, for example, whether change of the master-side operation characteristic G63 is required or not.

(Processing of Operation Pattern Switching Unit 83)

An operator can operate a machine with a desired operation pattern by switching a master-side operation pattern by the master-side device 60 even without switching a machine-side operation pattern by the operation pattern switching valve 30. A specific example of switching an operation pattern by the operation pattern switching unit 83 is as follows. In the example shown in FIG. 2, master-side operation patterns set by the operation pattern switching unit 83 include the patterns P1, P2, and P3.

The pattern P1 is a pattern in which no operation pattern is switched. In FIG. 2, "input" represents the first command and "output" represents the second command for each of the patterns P1 to P3. In the first command, for example, "left lever: forward" denotes forward operation of the master-side lever 63. Also in the second command, for example, "left lever: rightward" indicated in the pattern P2 denotes rightward operation of the machine-side lever 17L.

Specifically, in the pattern P1, "left lever: forward" as the first command is associated with "left lever: forward" as the second command. Therefore, when the first command "left lever: forward" is output from the master-side lever 63L, the operation pattern switching unit 83 outputs the second command "left lever: forward" without converting the first command "left lever: forward". In this case, the master-side device 60 shown in FIG. 1 transmits the second command "left lever: forward" to the slave-side device 50. The second command "left lever: forward" is transmitted in combination with a command value according to an amount of operation of the master-side lever 63L. In this case, the machine-side lever 17L is operated forward by an amount of operation according to the transmitted command value, thereby controlling a pilot pressure of the pilot line 27 corresponding to the forward operation of the machine-side lever 17L. This is also the case with other operation directions and other patterns. In the following, the machine-side lever 17 and the slave-side device 50 will be described with reference to FIG. 1.

As shown in FIG. 2, the pattern P2 is a pattern in which an operation pattern is switched. Specifically, in the pattern P2, "left lever: forward" as the first command is associated with "left lever: rightward" as the second command. Therefore, when the first command "left lever: forward" is output from the master-side lever 63L, the operation pattern switching unit 83 converts the first command "left lever: forward" to the second command "left lever: rightward" and outputs "left lever: rightward". In this case, the second command "left lever: rightward" is transmitted in combination with a command value according to an amount of operation of the master-side lever 63L. As a result, the machine-side lever 17L is operated rightward by an amount of operation according to the command value, thereby controlling a pilot pressure of the pilot line 27 corresponding to the rightward operation of the machine-side lever 17L.

A specific example of a case where the pattern P2 is selected is as follows. A machine-side operation pattern selected by the operation pattern switching valve 30 is assumed to be an operation pattern (hereinafter, referred to as a "lateral turn pattern") in which the leftward-rightward operation of the machine-side lever 17L causes the upper stewing body 13 to turn. On the other hand, an operation pattern desired by an operator is assumed to be an operation pattern (hereinafter, referred to as a "vertical turn pattern") in which forward-backward operation of the master-side lever 63L causes the upper stewing body 13 to turn. In this case, selection of the pattern P2 shown in FIG. 2 enables the operator to operate with the "vertical turn pattern" while the machine-side operation pattern remains the "lateral turn pattern".

As shown in the pattern P3, the operation pattern switching unit 83 may convert the first command "left lever: forward" indicative of the forward operation of the master-side lever 63L on the left side to a second command "right lever: forward" indicative of the forward operation of the machine-side lever 17R on the right side. Additionally, although not shown in FIG. 2, the operation pattern switching unit 83 may convert operation of the master-side lever 63R on the right side to operation of the machine-side lever 17L on the left side.

(Operation Characteristic Identical Control)

The operation characteristic setting unit 87 conducts the operation characteristic identical control. As shown in FIG. 4, the operation characteristic identical control is control for setting the master-side operation characteristic G63 to be on a side closer to the machine-side operation characteristic G17. Details of the operation characteristic identical control are as follows.

There is a case where converting the first command to the second command by the operation pattern switching unit 83 shown in FIG. 2 associate a first operation of the master-side lever 63 with a second operation of the machine-side lever 17 having a different amount of stroke. For example, in the pattern P2, although the first command "left lever: forward" is converted to a second command "right lever: rightward", since an amount of stroke of the master-side lever 63 in the forward operation is A4 and an amount of stroke of the machine-side lever 17 in the rightward operation is A2, the two amounts of stroke are different from each other.

In this case, unless the operation characteristic identical control is conducted, the amount of operation of the master-side lever 63 in the forward operation will have a command value determined according to the first master-side operation characteristic G63a as shown in FIG. 4. Here, the first master-side operation characteristic G63a is the master-side operation characteristic G63 in a case of non-execution of the operation characteristic identical control.

The "second operation" is operation corresponding to the first operation, which is specifically operation (e.g., rightward operation) that should be applied to the machine-side lever 17 for causing the actuator 23 to conduct activation as a target for the first operation (e.g., forward operation) to be applied to the master-side lever 63.

In the following, the first master-side operation characteristic G63a of the first operation of the master-side lever 63 will be also referred to simply as "the first master-side operation characteristic G63a". This is also the case with the second master-side operation characteristic G63b to be described later. Additionally, the machine-side operation characteristic G17 of the second operation of the machine-side lever 17 will be also referred to simply as "the machine-side operation characteristic G17".

Specifically, in the machine-side operation characteristic G17, when the amount of operation is the command-value-maximum amount of operation A1a, the command value becomes the maximum command value C1. By contrast, in the first master-side operation characteristic G63a, the master-side lever 63 is calibrated so that when the amount of operation is the command-value-maximum amount of operation A3, the command value becomes the maximum command value D2. Also in the first master-side operation characteristic G63a, a command value D1 for a command-value-maximum amount of operation A1b equal to the command-value-maximum amount of operation A1a becomes smaller than the maximum command value D2. Thus, the first master-side operation characteristic G63a and the machine-side operation characteristic G17 are different from each other. Therefore, when a command value according to the amount of operation of the master-side lever 63 is determined based on the first master-side operation characteristic G63a, the operator cannot operate the master-side lever 63 by the same operation characteristic as the machine-side lever 17.

The operation characteristic setting unit 87 accordingly conducts the operation characteristic identical control for setting the first master-side operation characteristic G63a to be on a side closer to the machine-side operation characteristic G17. The master-side operation characteristic G63 set by the operation characteristic identical control will be referred to as the second master-side operation characteristic G63b.

A specific example of the second master-side operation characteristic G63b set by the operation characteristic identical control is as follows.

EXAMPLE 1

In Example 1, in the second master-side operation characteristic G63b, the command-value-maximum amount of operation A1b is set on a side (smaller side) closer to the command-value-maximum amount of operation A1a of the machine-side operation characteristic G17 than to the command-value-maximum amount of operation A3 of the first master-side operation characteristic G63a.

EXAMPLE 2

In Example 2, in the second master-side operation characteristic G63b, the command-value-maximum amount of operation A1b is set to be coincident or generally coincident with the command-value-maximum amount of operation A1a of the machine-side operation characteristic G17.

EXAMPLE 3

In Example 3, the second master-side operation characteristic G63b is set to have an amount of change closer to an amount of change of the machine-side operation characteristic G17 than to an amount of change of the first master-side operation characteristic G63a (i.e., set to have a larger inclination). Here, the amount of change of the first master-side operation characteristic G63a corresponds to an amount of change (an inclination of the graph) of the command value relative to an amount of operation in the section from the amount of play A0b to the command-value-maximum amount of operation A3. An amount of change of the second master-side operation characteristic G63b corresponds to an amount of change of the command value relative to an amount of operation in a section from the amount of play A0b to the command-value-maximum amount of operation Ab. An amount of change of the machine-side operation characteristic G17 corresponds to an amount of change of the command value relative to an amount of operation in the section from the amount of play A0a to the command-value-maximum amount of operation A1a.

EXAMPLE 4

In Example 4, the second master-side operation characteristic G63b is set to have an amount of change coincident or generally coincident with an amount of change of the machine-side operation characteristic G17.

EXAMPLE 5

In Example 5, the second master-side operation characteristic G63b may be set to have the amount of play A0b coincident or generally coincident with the amount of play A0a of the machine-side operation characteristic G17.

EXAMPLE 6

In Example 6, the second master-side operation characteristic G63b may have the command value set to be the maximum command value D2 in a section from the command-value-maximum amount of operation A1b to the maximum amount of operation A4.

[Example 1] to [Example 6] can be combined, in which one of [Example 1] and [Example 2] is adopted and one of [Example 3] and [Example 4] is adopted.

Whether the operation characteristic identical control is to be conducted or not is switched by operation of the operation unit 71 by an operator. Non-execution of the operation characteristic identical control is preferable in, for example, the following case. In the pattern P2 shown in FIG. 2, the first command "left lever: forward" indicative of the forward operation of the master-side lever 63L is converted to the second command "left lever rightward" indicative of the rightward operation of the machine-side lever 17L. As a result, the forward operation of the master-side lever 63L causes the upper slewing body 13 to turn right.

At this time, when the operation characteristic identical control combining [Example 2], [Example 4], [Example 5], and [Example 6] is conducted, an operation characteristic of the forward operation of the master-side lever 63L becomes the second master-side operation characteristic G63b as shown in FIG. 4.

However, in the forward operation of the master-side lever 63L, an operator accustomed to an operation characteristic of outputting the maximum command value D2 at the command-value-maximum amount of operation A3 might desire the first master-side operation characteristic G63a. In this case, it is better not to conduct the operation characteristic identical control. Under these circumstances, the operation unit 71 is configured to be capable of accepting an instruction from an operator who switches execution/non-execution of the operation characteristic identical control in the present embodiment. Specifically, the operation unit 71 is configured to be capable of accepting an instruction from an operator who switches the first master-side operation characteristic G63a and the second master-side operation characteristic G63b. This configuration improves convenience to the operator.

The operation characteristic identical control is preferably conducted in a case where predetermined operation (e.g., forward operation) of the master-side lever 63 is converted to predetermined operation (e.g., rightward operation) of the machine-side lever 17, when an amount of stroke (e.g., A2) in the rightward operation of the machine-side lever 17 is smaller than an amount of stroke (e.g., A4) in the forward operation of the master-side lever 63. On the other hand, in a case where predetermined operation (e.g., leftward operation) of the master-side lever 63 is converted to predetermined operation (e.g., forward operation) of the machine-side lever 17, when an amount of stroke (e.g., A4) in the forward operation of the machine-side lever 17 is larger than an amount of stroke (e.g., A2) in the leftward operation of the master-side lever 63, the operation characteristic identical control need not be conducted.

(Adjustment of Operation Characteristic)

The operation characteristic setting unit 87 may arbitrarily set the master-side operation characteristic G63. In this case, an operator can arbitrarily set the master-side operation characteristic G63 so as to improve operability. In a case, for example, where a manufacturer of the working machine control device 40 is different from a manufacturer of the working machine 1, it is assumed that an amount of stroke of the master-side lever 63 and an amount of stroke of the machine-side lever 17 might be different from each other. In such a case, an operator, for example, can arbitrarily set the master-side operation characteristic G63 shown in FIG. 4 so as to operate with an accustomed operation characteristic. Additionally, for example, the smaller an amount of change (an inclination of the graph) of the master-side operation characteristic G63 becomes, the easier the fine adjustment of a command value is. Also, as the amount of change of the master-side operation characteristic G63 increases, the less amount of operation is required to largely change the command value. Also, by checking the stroke amount information displayed on the display unit 65, the operator can be easily set the master-side operation characteristic G63.

(Effects)

Effects obtained by the working machine control device 40 shown in FIG. 1 are as follows.

(Effect of First Invention)

The working machine control device 40 is capable of remotely controlling the working machine 1. The working machine 1 is provided with the actuator 23, the control valve 25, the machine-side lever 17, and the operation pattern switching valve 30. The control valve 25 controls activation of the actuator 23. The machine-side lever 17 outputs a pilot pressure according to operation to the control valve 25. The operation pattern switching valve 30, which is provided in the pilot line 27 between the machine-side lever 17 and the control valve 25, is a valve capable of switching a machine-side operation pattern as a combination pattern of operation of the machine-side lever 17 and activation of the actuator 23. The working machine control device 40 is provided with the slave-side device 50 and the master-side device 60. The slave-side device 50 is disposed in the working machine 1 and controls activation of the actuator 23 by controlling a pilot pressure of the pilot line 27. The master-side device 60, which is provided outside the working machine 1 and is radio-communicable with the slave-side device 50, transmits a command for controlling activation of the actuator 23 to the slave-side device 50. The master-side device 60 is provided with the master-side lever 63 and the operation pattern switching unit 83 (see FIG. 2). The master-side lever 63 outputs the first command according to operation.

[Configuration 1-1] The operation pattern switching unit 83 (see FIG. 2) switches a master-side operation pattern as a combination of the first command and the second command which is to be transmitted to the slave-side device 50 for operating the machine-side lever 17 based on an instruction from an operator who refers to information of machine-side operation patterns, and converts the first command to the second command according to the switched master-side operation pattern. The master-side antenna 90 transmits the second command converted by the operation pattern switching unit 83 to the slave-side device 50.

[Configuration 1-2] The slave-side device 50 transmits information of a machine-side operation pattern selected by the operation pattern switching valve 30 to the master-side device 60. The above-described [Configuration 1-1] enables a master-side operation pattern to be switched by the operation pattern switching unit 83, the master-side operation pattern being a combination pattern of the first command from the master-side lever 63 and the second command to the machine-side lever 17. It is accordingly unnecessary to switch the operation pattern switching valve 30 at the time of switching an operation pattern. As a result, switching work of the operation pattern switching valve 30 can be eliminated to save labor and time for this work, so that the operation pattern can be easily switched. Additionally, since no switching of the operation pattern switching valve 30 is required, no person needs to access the working machine 1 when switching a master-side operation pattern. Accordingly, as compared with a case where a person needs to access the working machine 1, an operation pattern can be more easily switched.

On the other hand, it is assumed that without information of a machine-side operation pattern selected by the operation pattern switching valve 30, an operator might have difficulty in determining how a master-side operation pattern should be switched. Under these circumstances, the working machine control device 40 is provided with the above-described [Configuration 1-2]. Accordingly, the master-side device 60 can set a master-side operation pattern by using information of a machine-side operation pattern selected by the operation pattern-switching valve 30. As a result, the operator can easily set a master-side operation pattern so that the actuator conducts desired activation for certain operation of the master-side lever 63. Also because of the above-described [Configuration 1-2], no person needs to access the working machine 1 for obtaining information of a machine-side operation pattern selected by the operation pattern switching valve 30. Accordingly, as compared with a case where a person needs to access the working machine 1, an operation pattern can be more easily switched. For allowing the slave-side device 50 to acquire information of a machine-side operation pattern at a time point before the slave-side device 50 transmits the information of the machine-side operation pattern to the master-side device 60, a person may access the working machine 1.

As a result of unnecessity of person's access to the working machine 1, the following effect can be obtained. In a case, for example, where the working machine 1 is used at a scene of disaster which is inaccessible or which is hard to be accessed by a person, a master-side operation pattern can be switched without person's access to the working machine 1.

(Effect of Second Invention)

[Configuration 2] The master-side device 60 is provided with the display unit 65 (the first display unit) which displays information of a machine-side operation pattern selected by the operation pattern switching valve 30.

The above-described [Configuration 2] enables an operator to know information of a machine-side operation pattern displayed on the display unit 65. As a result, for example, an operator can easily set a master-side operation pattern.

(Effect of Fourth Invention)

[Configuration 4] The slave-side device 50 transmits stroke amount information as information on an amount of stroke of the machine-side lever 17 to the master-side device 60. The above-described [Configuration 4] enables the master-side device 60 to acquire the stroke amount information of the machine-side lever 17 without person's access to the working machine 1. For allowing the slave-side device 50 to acquire stroke amount information at a time point before the slave-side device 50 transmits the stroke amount information to the master-side device 60, a person may access the working machine 1.

(Effect of Fifth Invention)

[Configuration 5] The master-side device 60 is provided with the display unit 65 (the second display unit) which displays stroke amount information.

The above-described [Configuration 5] enables an operator to know stroke amount information displayed on the display unit 65. As a result, for example, an operator can easily determine how the master-side operation characteristic G63 should be set.

(Effect of Sixth Invention)

[Configuration 6] The master-side device 60 is further provided with the operation characteristic setting unit 87 shown in FIG. 2. The operation characteristic setting unit 87 sets the master-side operation characteristic G63. The master-side operation characteristic G63 represents a relationship between an amount of operation as an amount of operation to be applied to the master-side lever 63 and a command value according to the amount of operation. The operation characteristic setting unit 87 can set the master-side operation characteristic G63 (see FIG. 4) according to a master-side operation pattern switched by the operation pattern switching unit 83. With the above-described [Configuration 6], the master-side operation characteristic G63 (see FIG. 4) can be automatically changed according to a master-side operation pattern switched by the operation pattern switching unit 83. Accordingly, when a master-side operation pattern is switched, an operator does not need to manually set the master-side operation characteristic G63 (see FIG. 4).

(Effect of Seventh Invention)

[Configuration 7] The operation characteristic setting unit 87 conducts the operation characteristic identical control. The operation characteristic identical control sets the master-side operation characteristic G63 of the first operation (e.g., forward operation) of the master-side lever 63 to be on a side closer to the machine-side operation characteristic G17 of the second operation (e.g., rightward operation) of the machine-side lever 17 corresponding to the first operation as shown in FIG. 4. The second operation is operation of the machine-side lever 17 to be applied to the machine-side operation device for causing the actuator to conduct target activation for the first operation. The machine-side operation characteristic G17 represents a relationship between an amount of operation of the machine-side lever 17 according to the second operation and a pilot pressure output from the machine-side lever 17.

The above-described [Configuration 7] enables the master-side operation characteristic G63 of the first operation (e.g., forward operation) of the master-side lever 63 to be closer to the machine-side operation characteristic G17 of the second operation (e.g., rightward operation) of the machine-side lever 17 corresponding to the first operation. As a result, an operator is allowed to operate the master-side lever 63 more easily.

(Effect of Eighth Invention)

[Configuration 8] As shown in. FIG. 1, the master-side device 60 is provided with the operation unit 71 (the acquisition unit). When an instruction to refrain from conducting the operation characteristic identical control is acquired by the operation unit 71, the operation characteristic setting unit 87 does not conduct the operation characteristic identical control.

The above-described [Configuration 8] enables an operator to switch whether to conduct the operation characteristic identical control or not. Accordingly, the operator can select an operation characteristic of the master-side lever 63. Operator's convenience can be accordingly improved.

Second Embodiment

Figure 5:
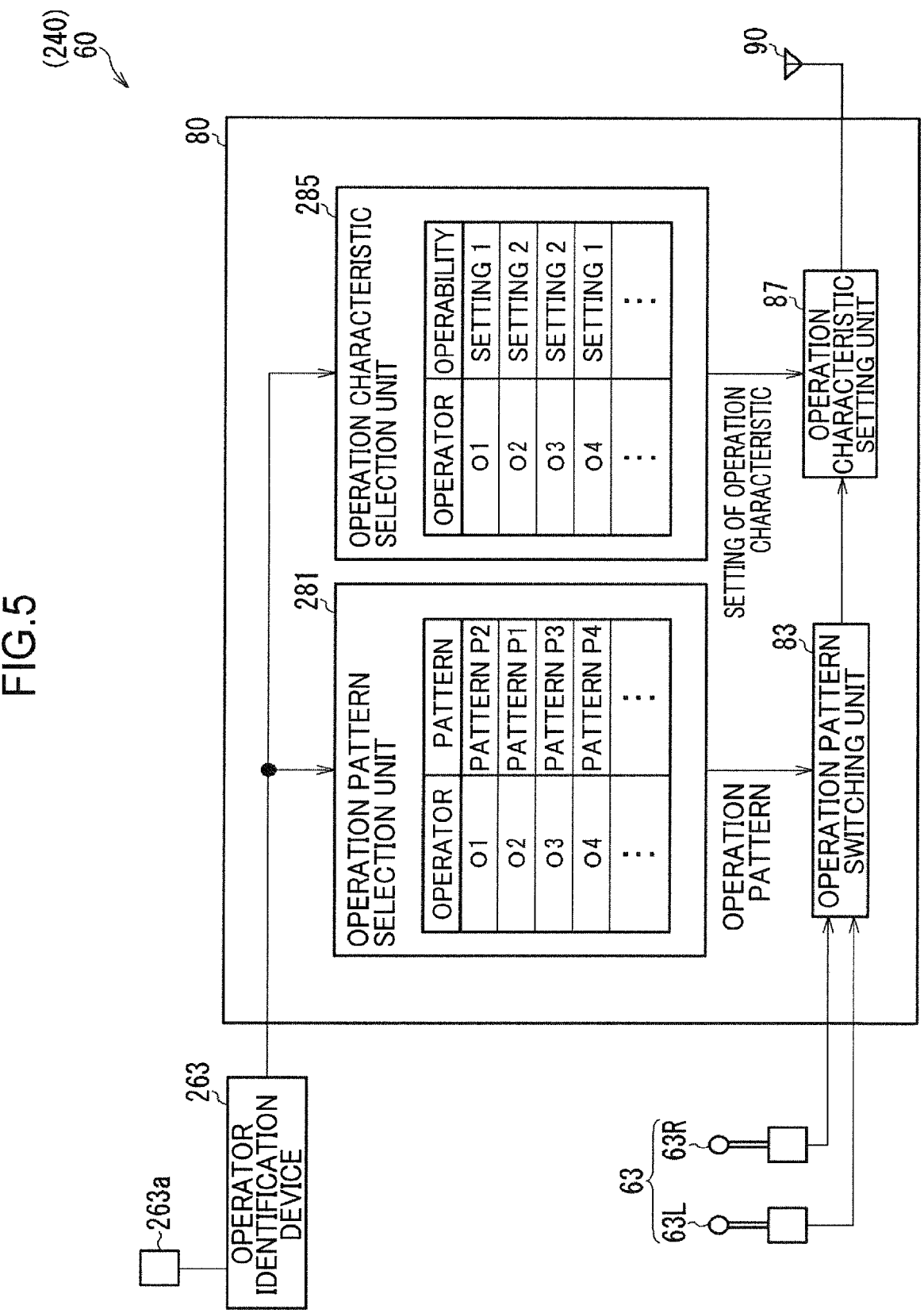
FIG. 5 is a diagram showing a master-side controller and the like of a working machine control device according to a second embodiment.

With reference to FIG. 5, description will be made of a difference of a working machine control device 240 of a second embodiment from the first embodiment. In the working machine control device 240 of the second embodiment, common components to those of the first embodiment are given the same reference codes as those of the first embodiment to omit description of the components. The difference resides in that the master-side device 60 is provided with an operator identification device 263 (one example of each of a first operator identification device and a second operator identification device). The difference also resides in that the master-side controller 80 is further provided with an operation pattern selection unit 281 and an operation characteristic selection unit 285.

The operator identification device 263 identifies an operator who operates the master-side lever 63. "An operator who operates the master-side lever 63" includes an operator who will operate the master-side lever 63.

The operator identification device 263 identifies an operator, for example, from an image of the operator captured by a camera 263a. The camera 263a may be, for example, an infrared camera, or, for example, a visible light camera. The camera 263a is arranged, for example, at a position that enables the master-side seat 61 to be photographed, The camera 263a may be arranged, for example, at a position that enables photographing of a position through which an operator pass without fail when the operator is going to sit on the master-side seat 61.

The operator identification device 263 may identify an operator by reading information of a recording medium such as a tag or a card in which information that can identify an operator stored. The first operator identification device and the second operator identification device may be commonly implemented by one operator identification device 263 or may not.

The operation pattern selection unit 281 selects a master-side operation pattern according to an operator.

In more detail, the operation pattern selection unit 281 stores, in a memory (not shown), a combination of an operator who operates the master-side lever 63 and a master-side operation pattern switched by the operation pattern switching unit 83 based on an instruction from the operator. Then, the operation pattern selection unit 281 selects a master-side operation pattern corresponding to an operator identified by the operator identification device 263. Then, the operation pattern switching unit 83 switches a master-side operation pattern to the master-side operation pattern selected by the operation pattern selection unit 281.

The operation characteristic selection unit 285 selects the master-side operation characteristic G63 (see FIG. 4) according to the operator. In more detail, the operation characteristic selection unit 285 stores, in a memory (not shown), a combination of an operator who operates the master-side lever 63 and setting of the master-side operation characteristic G63 set by the operation characteristic setting unit 87. Then, the operation characteristic selection unit 285 selects setting of the master-side operation characteristic G63 corresponding to the operator identified by the operator identification device 263. Then, the operation characteristic setting unit 87 sets the master-side operation characteristic G63 selected by the operation characteristic selection unit 285. Examples of the master-side operation characteristic G63 selected by the operation characteristic selection unit 285 include the first master-side operation characteristic G63a (see FIG. 4) and the second master-side operation characteristic G63b (see FIG. 4). Additionally, the setting of the master-side operation characteristic G63 selected by the operation characteristic selection unit 285 shown in FIG. 5 may include the master-side operation characteristic G63 arbitrarily set by an operator.

(Activation)

The operation pattern selection unit 281 and the operation characteristic selection unit 285 are used, for example, in the following manner. A certain operator O1 tries to operate the working machine 1 (see FIG. 1) by the master-side device 60 for the first time. At this time, the operator O1 selects a certain master-side operation pattern by using the operation unit 71 (see FIG. 1) to select or arbitrarily set the master-side operation characteristic G63. At this time, the operation pattern selection unit 281 combines the operator O1 and the selected master-side operation pattern (e.g., the pattern P2) and stores the combination in the memory.

Additionally, the operation characteristic selection unit 285 combines the operator O1 and the set master-side operation characteristic G63 and stores the combination in the memory. Then, when the operator O1 operates hereafter, the operation pattern selection unit 281 automatically selects the master-side operation pattern (e.g., the pattern P2) selected by the operator O1 in an initial operation. The operation characteristic selection unit 285 automatically selects setting of the master-side operation characteristic G63 set by the operator O1 in the initial operation. A combination of an operator who operates the master-side lever 63 and a master-side operation pattern may be set by the operation pattern selection unit 281 before the initial operation by the operator (this is also the case with the master-side operation characteristic G63). Also, the combination may be contained in a recording medium such as a tag or a card for identifying an operator. In a case where the operation pattern selection unit 281 automatically selects a master-side operation pattern, the display unit 65 (see FIG. 1) need not display a machine-side operation pattern. In a case where the operation characteristic selection unit 285 automatically selects setting of the master-side operation characteristic G63, the display unit 65 (see FIG. 1) need not display stroke information.

(Effects)

Effects obtained by the working machine control device 240 shown in FIG. 5 are as follows.

(Effect of Third Invention)

[Configuration 3] The master-side device 60 is provided with the operator identification device 263 (the first operator identification device) and the operation pattern selection unit 281. The operator identification device 263 identifies an operator who operates the master-side lever 63. The operation pattern selection unit 281 stores an operator who operates the master-side lever 63 and a master-side operation pattern switched by the operation pattern switching unit 83 based on an instruction from the operator in combination and selects a master-side operation pattern corresponding to the operator identified by the operator identification device 263. The operation pattern switching unit 83 switches a master-side operation pattern to the master-side operation pattern selected by the operation pattern selection unit 281.

With the above-described [Configuration 3], when an operator who operates the master-side lever 63 is changed, a master-side operation pattern according to the changed operator is automatically selected. Accordingly, operator's labor for manually setting a master-side operation pattern can be saved.

(Effect of Ninth Invention)

[Configuration 9] The master-side device 60 is provided with the operator identification device 263 (the second operator identification device) and the operation characteristic selection unit 285. The operator identification device 263 identifies an operator who operates the master-side lever 63. The operation characteristic selection unit 285 stores an operator who operates the master-side lever 63 and the master-side operation characteristic G63 (see FIG. 4) in combination and selects the master-side operation characteristic G63 corresponding to an operator identified by the operator identification device 263. The operation characteristic setting unit 87 sets the master-side operation characteristic G63 selected by the operation characteristic selection unit 285. With the above-described [Configuration 9], when an operator who operates the master-side lever 63 is changed, setting of the master-side operation characteristic G63 according to the changed operator is automatically selected. Accordingly, operator's labor for manually setting the master-side operation characteristic G63 can be saved.

(Modification)

The above-described embodiments can be variously modified. For example, the components of the first embodiment and the second embodiment can be combined. For example, connection of the respective components illustrated in the block diagrams shown in FIG. 2 and FIG. 5 may be changed. For example, the number of the components may be changed or a part of the components may not be provided.

The invention claimed is:

1. A working machine control device capable of remotely controlling a working machine provided with an actuator, a control valve which controls activation of the actuator, a machine-side operation device which outputs a pilot pressure according to operation to the control valve, and an operation pattern switching valve which is provided in a pilot line between the machine-side operation device and the control valve and switches a machine-side operation pattern as a combination of operation of the machine-side operation device and activation of the actuator, the working machine control device comprising:
 a slave-side device which is disposed in the working machine and controls activation of the actuator by controlling a pilot pressure of the pilot line; and
 a master-side device which is provided outside the working machine and is radio-communicable with the slave-side device, and transmits a command for controlling activation of the actuator to the slave-side device, wherein
 the slave-side device transmits information of a machine-side operation pattern selected by the operation pattern switching valve to the master-side device, and
 the master-side device includes:
  a master-side operation device which outputs a first command according to operation of an operator;
  an operation pattern switching unit which switches a master-side operation pattern as a combination of the first command and a second command to be transmitted to the slave-side device for operating the machine-side operation device based on an instruction from an operator who refers to the information of the machine-side operation pattern, and converts the first command to the second command according to the switched master-side operation pattern; and
  a communication unit which transmits the second command converted by the operation pattern switching unit to the slave-side device.

2. The working machine control device according to claim 1, wherein
 the master-side device further includes a first display unit which displays the information of the machine-side operation pattern selected by the operation pattern switching valve.

3. The working machine control device according to claim 1, wherein
 the master-side device further includes:
  a first operator identification device which identifies the operator who operates the master-side operation device; and
  an operation pattern selection unit which stores the operator who operates the master-side operation device and the master-side operation pattern switched by the operation pattern switching unit based on an instruction from the operator in combination and selects the master-side operation pattern corresponding to the operator identified by the first operator identification device, and
 the operation pattern switching unit switches a master-side operation pattern to the master-side operation pattern selected by the operation pattern selection unit.

4. The working machine control device according to claim 1, wherein
 the slave-side device transmits stroke amount information as information on an amount of stroke of the machine-side operation device to the master-side device.

5. The working machine control device according to claim 4, wherein,
 the master-side device further includes a second display unit which displays the stroke amount information.

6. The working machine control device according to claim 4, wherein
 the master-side device further includes an operation characteristic setting unit which sets a master-side operation characteristic as a relationship between an amount of operation as an amount of operation to be applied to the master-side operation device and a command value according to the amount of operation, and
 the operation characteristic setting unit sets the master-side operation characteristic according to the master-side operation pattern switched by the operation pattern switching unit.

7. The working machine control device according to claim 6, wherein
 the operation characteristic setting unit conducts operation characteristic identical control for setting the master-side operation characteristic of a first operation of the master-side operation device to be on a side closer to a machine-side operation characteristic of a second operation of the machine-side operation device, the second operation being operation corresponding to the first operation,
 the second operation is operation to be applied to the machine-side operation device for causing the actuator to conduct target activation for the first operation, and
 the machine-side operation characteristic represents a relationship between an amount of operation as an amount of operation to be applied to the machine-side operation device according to the second operation and the pilot pressure output from the machine-side operation device.

8. The working machine control device according to claim 7, wherein
 the master-side device further includes an acquisition unit which acquires an instruction from the operator on whether to conduct the operation characteristic identical control or not, and
 when the acquisition unit acquires an instruction not to conduct the operation characteristic identical control, the operation characteristic setting unit refrains from conducting the operation characteristic identical control.

9. The working machine control device according to claim 6, wherein
the master-side device includes:
a second operator identification device which identifies the operator who operates the master-side operation device; and
an operation characteristic selection unit which stores the operator who operates the master-side operation device and the master-side operation characteristic set by the operation characteristic setting unit in combination and selects the master-side operation characteristic corresponding to an operator identified by the second operator identification device, and
the operation characteristic setting unit sets the master-side operation characteristic selected by the operation characteristic selection unit.

* * * * *